(12) United States Patent
Viswanatham et al.

(10) Patent No.: US 7,165,186 B1
(45) Date of Patent: Jan. 16, 2007

(54) SELECTIVE CHECKPOINTING MECHANISM FOR APPLICATION COMPONENTS

(75) Inventors: Satish C. Viswanatham, San Francisco, CA (US); Laurence P. Cable, Surrey (GB); Sreeram Duvur, Fremont, CA (US); Akm Nazrul Islam, Santa Clara, CA (US); Mark Basler, Milpitas, CA (US); Kenneth Ebbs, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 550 days.

(21) Appl. No.: 10/681,010

(22) Filed: Oct. 7, 2003

(51) Int. Cl.
*G06F 11/00* (2006.01)

(52) U.S. Cl. .......................... 714/1; 709/105
(58) Field of Classification Search .................... 714/1, 714/2, 4, 6, 11, 13, 15, 47; 709/105, 106
See application file for complete search history.

(56) References Cited

U.S. PATENT DOCUMENTS

| | | | | |
|---|---|---|---|---|
| 5,630,047 | A * | 5/1997 | Wang | 714/15 |
| 6,154,877 | A * | 11/2000 | Ramkumar et al. | 717/114 |
| 6,161,219 | A * | 12/2000 | Ramkumar et al. | 717/130 |
| 6,298,039 | B1 * | 10/2001 | Buskens et al. | 370/216 |
| 6,834,358 | B1 * | 12/2004 | Korenevsky et al. | 714/15 |
| 2002/0032883 | A1 * | 3/2002 | Kampe et al. | 714/16 |
| 2005/0034014 | A1 * | 2/2005 | Moser et al. | 714/17 |
| 2005/0097078 | A1 * | 5/2005 | Lohman et al. | 707/2 |

OTHER PUBLICATIONS

Administration Console Online Help—JTA, http://:e-docs.bea.com/wls/docs81/consolehe..., (Aug. 17, 2003) (17 pages).
"IBM WebSphere Portal Version 4.2 Performance Tuning Guide—Document Version 1.0," IBM WebSphere Portal Perfromance Team, May 2003, (30 pages).
Jon Howell, "Straightforward Java Persistance Through Checkpointing," Department of Computer Science Dartmouth College, Aug. 6, 1998 (15 pages).
"BEA WebLogic Server and WebLogic Express—Administration Guide—Release 7.0," BEA, Sep. 3, 2002, (30 pages).

* cited by examiner

*Primary Examiner*—Nadeem Iqbal
(74) *Attorney, Agent, or Firm*—Robert C. Kowert; Meyertons, Hood, Kivlin, Kowert & Goetzel, P.c.

(57) ABSTRACT

A system and method for selectively checkpointing application components. In one embodiment this method may include deploying a plurality of application components on a server, determining checkpoint information for each application component on the server, and selectively checkpointing each component during execution of each component according to the checkpoint information for each component. In one embodiment the checkpoint information may be provided by a checkpoint selection heuristic, which makes checkpoint selections based on a description of one or more methods of the application component. In one embodiment the checkpoint information may be provided by a deployment descriptor, which may have multiple overriding tiers to facilitate precise selection of methods, components and modules for checkpointing. In one embodiment the checkpoint and activation process may include callback routines which prepare an application component for checkpointing and activation.

36 Claims, 7 Drawing Sheets

```
Component descriptor 300

SetValue(int val)

GetValue()

ClearValue()

CalcValue(function func)
```

SELECTIVE CHECKPOINTING MECHANISM FOR APPLICATION COMPONENTS

BACKGROUND OF THE INVENTION

1. Field of the Invention

This invention relates to the field of high-availability computer systems and, more particularly, to checkpointing application components.

2. Description of the Related Art

As web-based applications become more important to business and industry, system failure becomes more expensive, and highly reliable systems assume a greater importance. For example, a web site may handle financial, production, sales, marketing or media applications. Failure to provide these applications to clients for even a few minutes could mean thousands or millions of dollars in lost income.

One way to provide applications on a highly reliable basis is a distributed system with a plurality of redundant components. In a distributed system, a plurality of servers may be connected by a load balancer and a network. Each server may execute one or more application components which comprise a web application. In addition, each application component may have one or more redundant backup components located on a separate server. In the event of a server failure, a redundant backup component located on a still-operational server may be activated, and execution of the application may continue with little to no break in service.

In order to maintain backup application components, the current state of active application components may be checkpointed to a backup store. Current data values for each application component running on a server may be in a data file or other data object. In the event of a server failure, the data objects may then be retrieved by fail-over components on another server. By restoring the data values of each failed component, a backup component may in effect "become" the failed component, and thus be able to continue any actions that the failed component was carrying out prior to failure.

In order to minimize the complexity and effort needed to create a web application, servers may provide built-in checkpoint functionality to application components, thereby saving programmers the effort of creating their own checkpoint mechanisms. Some servers may checkpoint application components by replicating the component state in memory (as opposed to a persistent store) on another server for a secondary instance of the application component. If the primary component fails, the secondary component takes over. However, this limits flexibility in choice of fail-over components. For example, load balancing fail-overs may not be possible. Other servers may checkpoint all application components to a persistent store a periodic time intervals. Although checkpointing to a persistent store may provide more flexibility in managing the fail-over of application components, checkpointing at periodic intervals may result in unnecessary checkpointing in some cases and may miss application state changes in other cases. Typically, conventional application servers apply the same checkpointing technique to all application components running on that server. Thus, all application components on a particular server are typically checkpointed the same way.

In addition, some application components may contain data structures that are not readily serializable to be checkpointed to a persistent store. Such components may not be checkpointed.

SUMMARY

A system and method for selectively checkpointing application components is disclosed. In one embodiment this method may include deploying a plurality of application components on a server, determining checkpoint information for each application component on the server, and selectively checkpointing each component during execution of each component according to the checkpoint information for each component. In one embodiment the checkpoint information may be provided by a checkpoint selection heuristic, which makes checkpoint selections based on a description of one or more methods of the application component. In one embodiment the checkpoint information may be provided by a deployment descriptor, which may have multiple overriding tiers to facilitate precise selection of methods, components and modules for checkpointing. In one embodiment the checkpoint and activation process may include callback routines which prepare an application component for checkpointing and activation.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
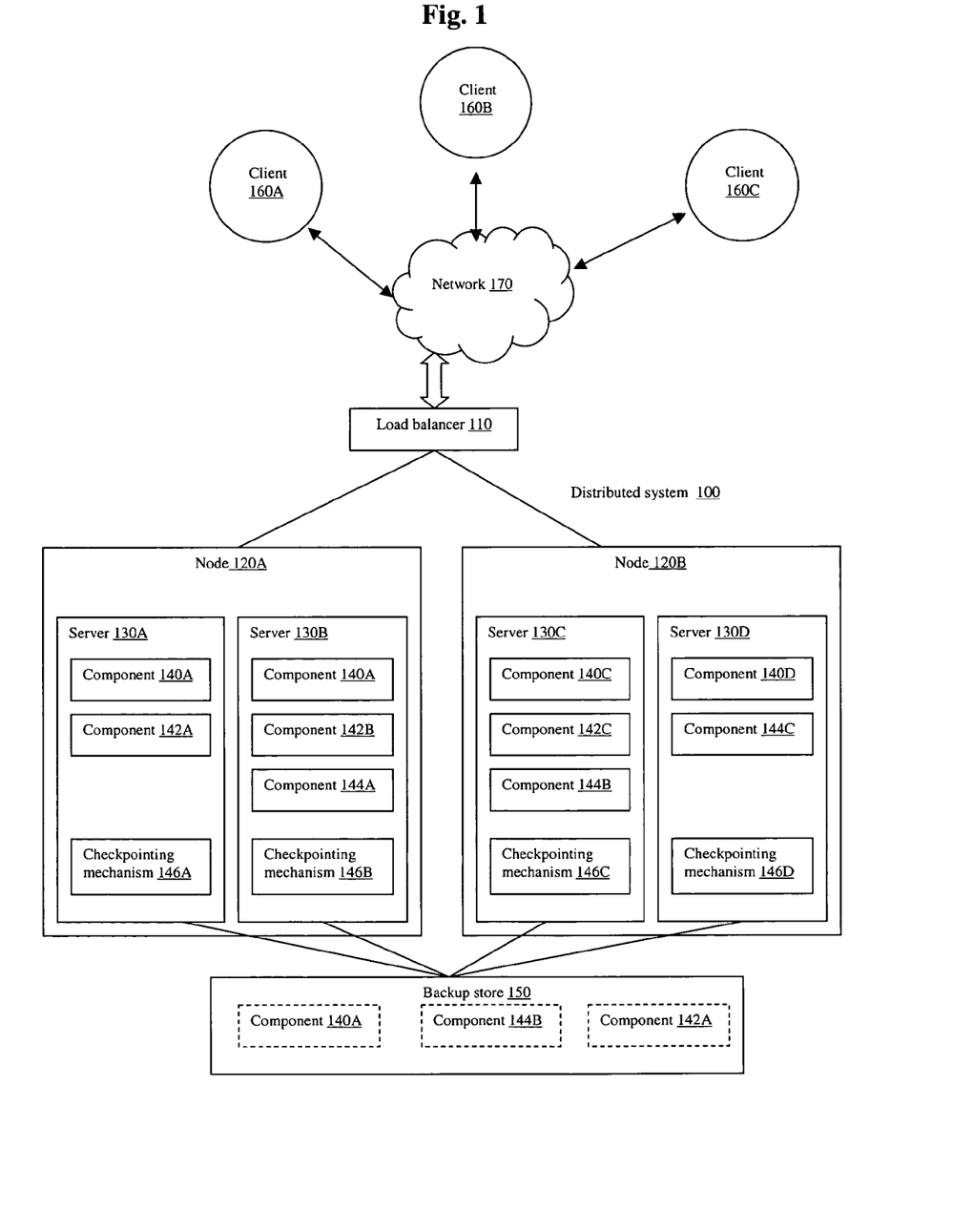
FIG. 1 is a block diagram of a distributed system, according to one embodiment.

Turning now to FIG. 1, a block diagram of an exemplary distributed system 100 is shown. Distributed system 100 contains a load balancer 110, which is coupled to a plurality of nodes 120A–B, each of which contains a plurality of servers 130A–D. Load balancer 110 is also coupled to clients 160A–C via network 170, and each server 130A–D is also coupled to backup store 150.

Network 170 may be a local area network (LAN), a wide area network (WAN), the Internet, system backplane(s), other type of communication medium, or a combination thereof. Network 170 may be operable to transmit requests for various application services from clients 160A–C to distributed system 100, and to transmit application responses from distributed system 100 to clients 160A–C.

Load balancer 110 is operable to receive requests from clients 160A–C. Load balancer 110 may be operable to forward the requests in a balanced manner to servers 130 A–D, so that each server 130A–D receives approximately the same overall workload and/or number of requests. Load balancer 110 may further be operable to receive responses generated by servers 130A–D, and forward these responses back to the appropriate clients 160A–C.

Each node 120A–B may be a separate hardware system with one or more independent processors, memory, network interfaces and power supplies, as will be described below. Each node 120A–B may be operable to execute one or more software servers 130A–D. In one embodiment, servers 130A–D may be operable to provide an execution environment for various application components, including checkpointing mechanisms 146A–D, as will be described further below.

Each server 130A–C may contain a copy of application components 140A–D, 142A–C, and 144A–C. Application components 140A–D, 142A–C, and 144A–C may be Java Beans or any other kind of application component. In various embodiments, each application component 140A–D, 142A–C, or 144A–C may be an active or backup application component operable to provide e-commerce, database access, remote configuration, or any other kind of network or web-based application functionality.

For example, application component 140A on server 130A may be an active application component operable to provide remote directory functionality to clients 160A–C. Application components 140B and 140 C on servers 130B and 130C, respectively, may be operable to retrieve the current state of application component 140A and continue to provide remote directory functionality if component 140A fails or server 130A crashes, as will be described below.

Persistent store 150 may be operable to store one or more data files, or other type of data objects, representing the current state of various active components 140A–D, 142 A–C, and 144A–C, as will be described in further detail below.

It is noted that many of the details in FIG. 1 are purely illustrative, and that other embodiments are possible. For example, the number of load balancers 110, nodes 120, servers 130, applications 140, 142 and 144 and application components is purely illustrative. Server cluster 100 may have any number of load balancers 110, nodes 120, servers 130, applications 140, 142 and 144, or application components. In some embodiments, load balancer 110 may be implemented on one or more of nodes 120 A–B. Furthermore, in some embodiments each server 130A–D may be located on a separate node 120. In one embodiment, backup store 150 may be located on a separate computer from nodes 120A–B, while in other alternate embodiments, backup store 150 may be located on one or more nodes 120A–B.

Figure 2:
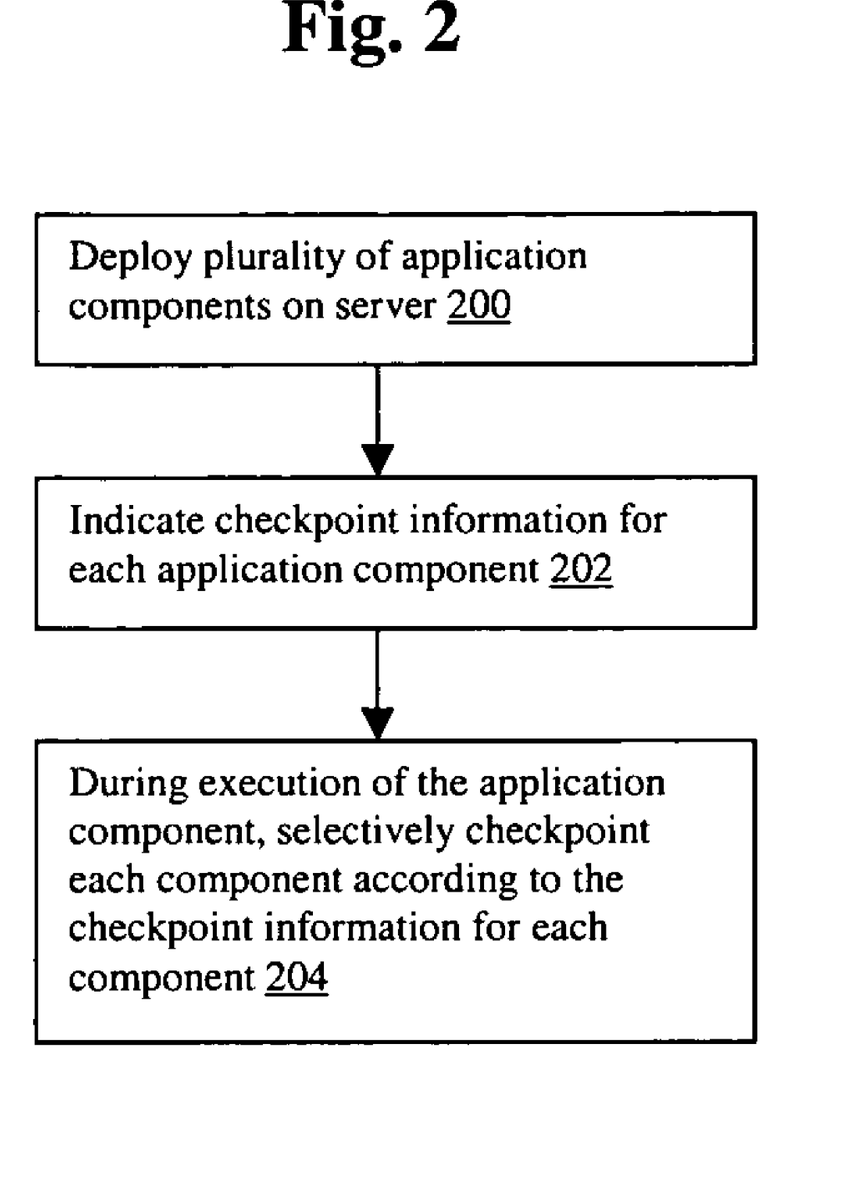
FIG. 2 is a flow diagram illustrating one embodiment of a method for selective checkpointing.

FIG. 2 is a flow diagram illustrating one embodiment of a method for selective checkpointing. Referring collectively now to FIGS. 1–2, in 200 a plurality of application components 140A–D, 142A–C and 144A–C are deployed on servers 130A–D, as described above. In 202, checkpoint information is indicated for specific applications, modules, and components in various embodiments, as will be described in further detail below. The checkpoint information may indicate different checkpointing criteria for various application components. In 204, active application component 140A–D, 142A–C and 144A–C are selectively checkpointed by checkpoint mechanisms 146A–D during execution according to the checkpoint information.

For example, components 140A, 144B, and 142A may be active components executing on servers 130A and 130C. During the execution of these components, checkpoint mechanisms 146A and 146C on servers 130A and 130C respectively may be operable to take a checkpoint of the active components according to various checkpoint information, and store the conversational state of the active components to persistent store 150. If, for example, server 130C fails, server 130B may be able to retrieved the saved state of component 144B and load the state to component 144A before activating 144A as the active component, thereby allowing execution of the application represented by components 144A and B to execute with minimal disruption of service.

Figure 3:
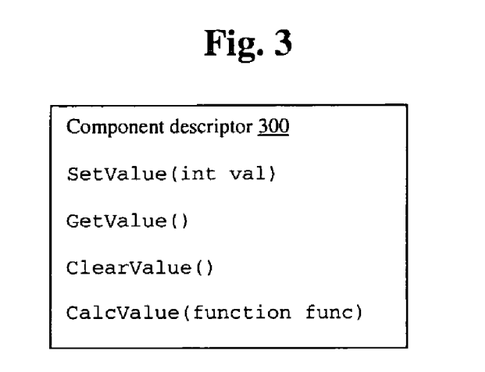
FIG. 3 illustrates an exemplary component descriptor for an application component.
Figure 4:
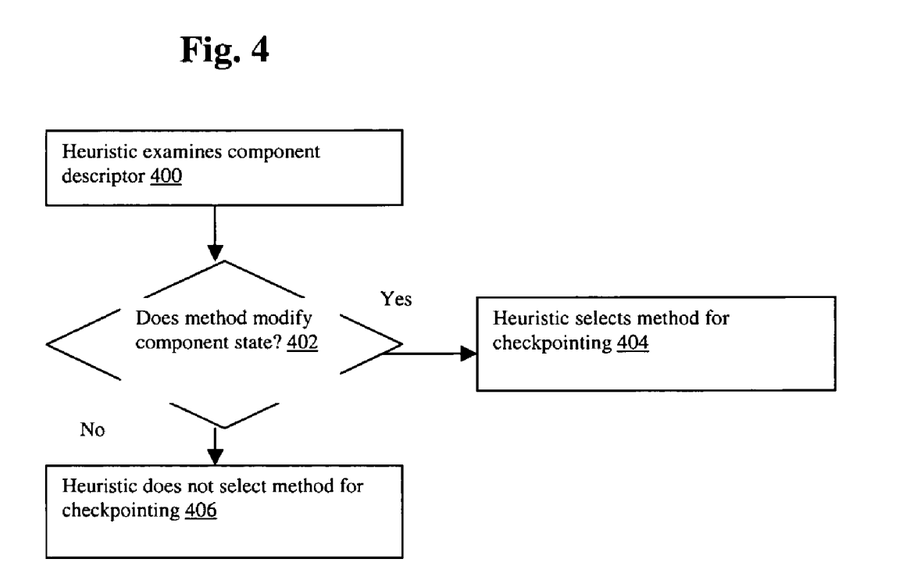
FIG. 4 is a flow diagram illustrating one embodiment of a heuristic for indicating checkpoint information.

Referring now to FIGS. 3 and 4, heuristics may be use to examine a description of an application component and determine when an/or if to checkpoint the component. A component descriptor 300 for an exemplary application component is shown in FIG. 3. Component descriptor 300 includes method descriptors for a plurality of methods that are part of the application component. For example, the SetValue method is part of the exemplary application component. SetValue takes a single parameter, val of type int. Alternatively, ClearValue is another method that is part of application component. ClearValue takes no input parameters.

FIG. 4 is a flow diagram illustrating one embodiment of a method for a heuristic providing the selective checkpoint information described in 202 of FIG. 2. In one embodiment, checkpoint information indicating which particular methods of an application component should trigger a checkpoint may be provided by a heuristic routine that examines a component descriptor, as will be described below.

Referring collectively now to FIGS. 1–4, in 400, a heuristic examines an application component descriptor. As described above, each component descriptor contains information describing the methods contained within an application component, an may also describe what input parameters are taken by those methods.

In 402, the heuristic examines each method to determine if the method modifies the component state. For example, in component descriptor 300, the heuristic may determine that the SetValue method modifies the state of the component the method belongs to, since the method takes an input parameter and since the name of the method, SetValue, implies that a data value in the component may be modified by the method. Alternatively, the heuristic may determine that the GetValue method does not modify the state of the component, since the method does not take an input parameter and the name of the method does not imply that a data value is modified.

In various embodiments, different parameters may be used by the heuristic to determine if a particular component method modifies a component value. It is also noted that in various embodiments the heuristic may not be able to perfectly determine if a component method modifies the component state. In such an instance, the heuristic may indicate that a component method modifies the component state, thereby increasing the likelihood that all changes to the state of the component will be checkpointed.

If, in 402, it is determined that the method does not modify the component state, the subroutine does not select the method for checkpointing. Alternatively, if, in 402, it is determined that the method modifies the component state, the heuristic selects the method for checkpointing. As described above in FIG. 2, according to this indication the component state will be checkpointed after the selected method executes, thereby saving any component state modification the completed method has made to backup store 150. The heuristic technique may employ a set of rules base on common design patterns to identify method names that are likely to cause a state change. Such methods are identified for component checkpointing at the end of the method execution. It is noted that the heuristic method described in FIG. 4 may thus provide a method for providing checkpoint information, thereby allowing selected methods to be checkpointed without a need for a programmer to provide an explicit indication of checkpointing. The use of heuristics may also provide more efficient checkpointing as compared to checkpoint all components at periodic time intervals.

Figure 5:
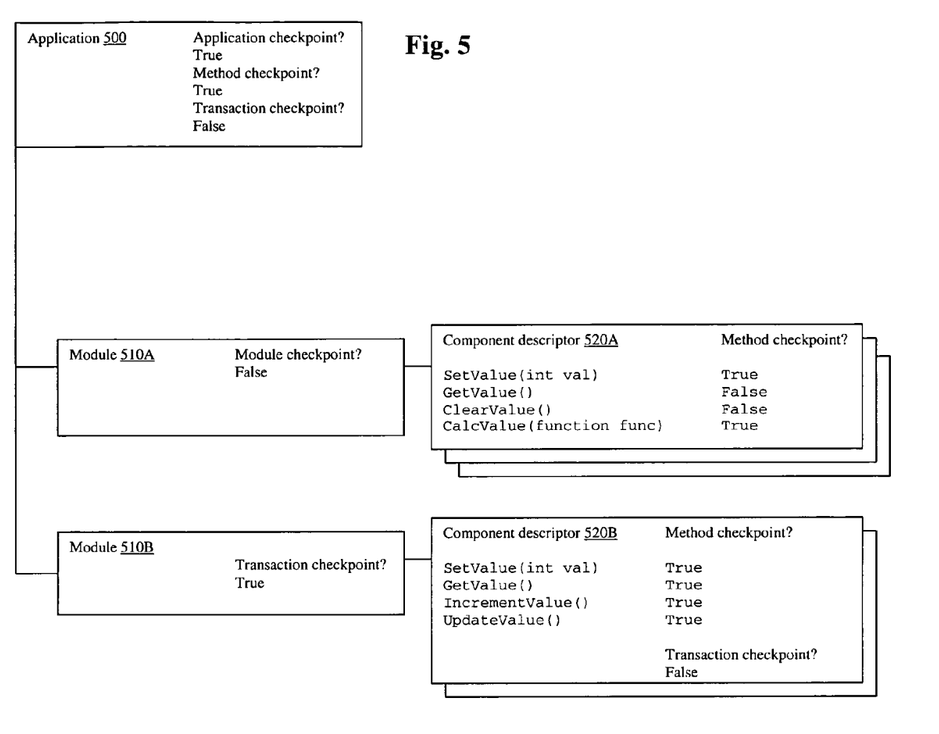
FIG. 5 is a block diagram of a deployment descriptor for indicating checkpoint information, according to one embodiment.

Turning now to FIG. 5, in other embodiments, checkpointing information for selective checkpointing of application components may be provided within configuration of deployment descriptors. An exemplary descriptor for an application and associated modules and components is shown. Application descriptor 500 is associated with a particular application which may execute on a server, as described above. The application may include various modules and each module may include various components. In one embodiment, application descriptor 500 may include descriptor elements to indicate checkpoint information for the entire application. For example, three such descriptor elements or indicators are illustrated at the application level in FIG. 5. These elements may be set by a programmer or administrator to indicate checkpoint information for the entire application, as described above in FIG. 2. A first indicator may indicate whether or not all components associated with the entire application should be checkpointed. In the illustrated example, this indicator is labeled "Application checkpoint?" and set to True, indicating a default for the application of checkpointing each component. A second indicator may indicate if checkpoints of the application should occur at the end of method execution. Yet another indicator may indicate if components of the application should be checkpointed at the end of a transaction, as will be described below. A transaction may comprise an atomic operation that is either completed successfully or rolled back. Another indicator could indicate whether time-based checkpointing should be applied. In some embodiments, a default checkpointing technique may be indicated for the entire server. For example, the server may default to checkpointing each component at the end of any method execution for a respective components, or checkpointing all components at a particular time interval. The server-wide checkpointing technique may be overridden by indicators in the descriptors for each application.

In one embodiment, an application may include one or more modules, each of which has one or more application components. Checkpointing information may also be provided by descriptor elements or indicators at the module and component levels. In one embodiment, checkpointing indicators provided at the module level override indicators at the application level. Similarly, indicators at the component level may override indicators at the module and application level. If an indicator is not specified at the one level, then an indicator at a higher level may provide the checkpointing information as a default. For example, module descriptor 510A may indicate that its components should not be checkpointed, despite the general indication in the application descriptor 500 to checkpoint all components. However, this may again be overridden at the component level as discussed below. Module descriptor 510B does not include a general checkpoint indicator. Therefore, the checkpoint indication from the application level would apply to module 510B such that the default will be to check point each component of module 510B. In the illustrated example the deployment descriptor for module 510B does override the application-level descriptor in regard to checkpointing upon completion of transactions. Thus, the descriptor for module 510B indicates that its components should be checkpointed whenever a transaction involving a respective component is completed.

Likewise, component descriptors 520A and 520B may indicate if individual methods associated with a particular component should trigger a checkpoint at the end of execution of the method. The indications for each method of a component may override indications at the module and application levels. Alternatively, a component descriptor may simply have one indicator for all its methods indicating whether the component should be checkpointed at each method execution. For example, all the methods associated with method descriptor 520B may be selected for checkpointing, while only a limited number of the methods associated with method descriptor 520A may be selected on a method-by-method basis. In the illustrated example, component descriptor 520B also includes an indicator indicating that the component should not be checkpointed upon method completion (overriding the module indicator).

It is noted that in one embodiment, application descriptor 500, module descriptors 510A–B and method descriptors 520A–B may form a hierarchy which allows an administrator to control checkpointing granularity, thereby providing increased control and selectivity of application checkpointing. As noted above, in one embodiment, each tier of the hierarchy may inherit from and override higher level tiers. For example, although application descriptor 500 may indicate that end-of-transaction checkpointing should not be carried out on the application, module descriptor 510B may indicate that end-of-transaction checkpointing should be applied for its components. Other checkpointing indicators may also be provided at any of the descriptor levels. For example, an indicator may be operable to indicate whether a component should be checkpointed when a component create method (e.g. ejbCreate) is called. A quick-checkpoint configuration indicator may allow flexibility for application components in regard to whether or not a passivation method (e.g., ejbPassivate) is called to serialize the component for checkpointing. If quick-checkpoint is selected in the component descriptor and the component is not serializable, the server container skips serialization for the non serializable fields and stores only serializable fields. The server container may replace non-serializable fields with nulls to create a serializable component. If quick-checkpoint is not selected and the component is not serializable, the server container may call the passivation method to come up with a serializable object. Descriptors may also include indicators to indicate whether a callback option is implemented to facilitate serialization for checkpointing to a persistent store.

Figure 6:
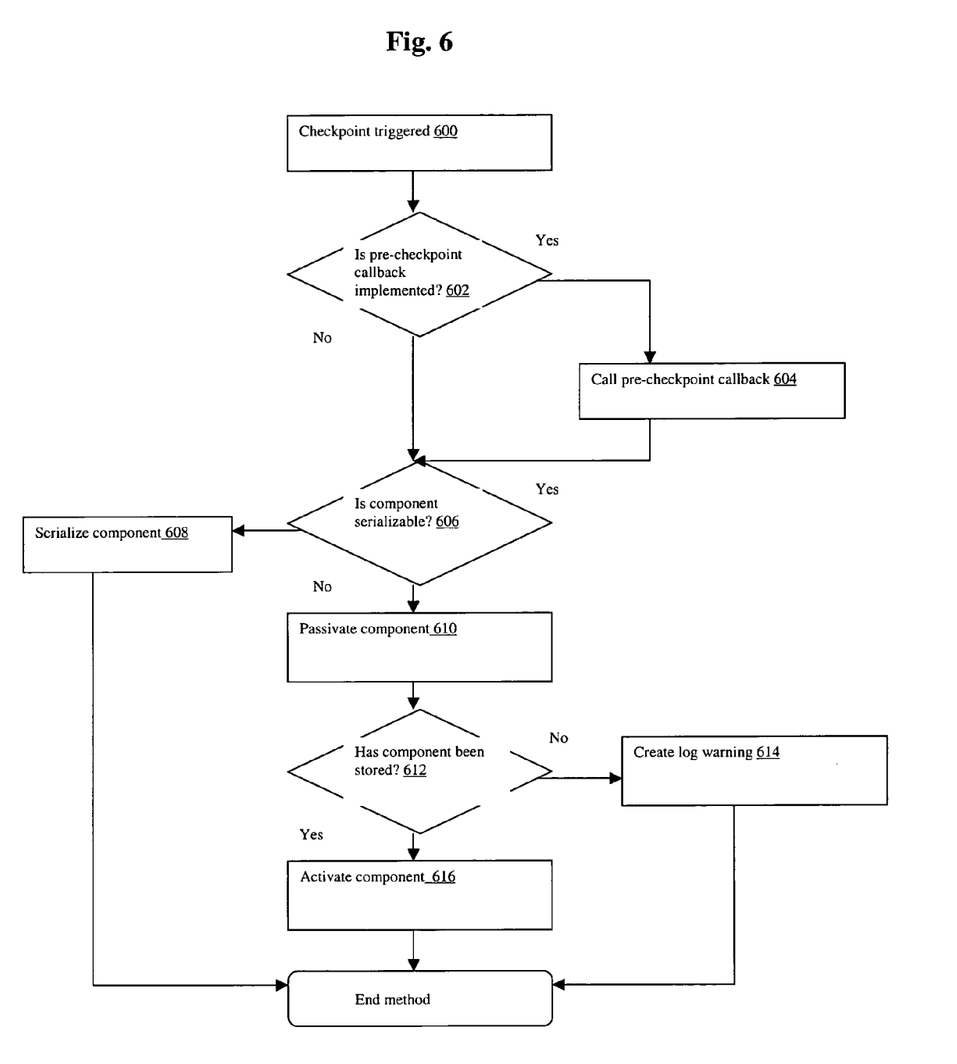
FIG. 6 is a flow diagram illustrating one embodiment of a method for checkpointing an application component with optional callbacks.

In some embodiments, application component callbacks may be provided to facilitate checkpointing. FIG. 6 is a flow diagram illustrating one embodiment of a method for checkpointing a component with optional callbacks. Referring collectively now to FIGS. 1–6, in 600 a checkpoint of a component is triggered according to checkpoint information, as described above in 204 of FIG. 2 and for FIGS. 3–5. For example, checkpointing may be triggered according to information indicated by applying a heuristic technique or from configuration or deployment descriptors.

As indicated at 602, a pre-checkpoint callback is implemented may optionally be implemented for a component. In some embodiments, pre-checkpoint callbacks may be utilized to prepare a component for checkpointing by preparing or "flattening" data structures. However, some components may not require any preliminary actions to be taken before they are checkpointed, and thus, may not implement callbacks.

If, in 602, it is determined that pre-checkpoint callbacks are not implemented, the method advances to 606, as will be described below. Alternatively, if, in 602, it is determined that pre-checkpoint callbacks are implemented, then the method advances to 604. In 604, a pre-checkpoint callback is executed to the component to prepare itself for checkpointing, as described above. The method then advances to 606.

In 606, the method determines if the component is serializable, such that the data in the component may be written to a persistent store without data loss. If it is determined in 606 that the component is serializable, the method advances to step 608 wherein the component data is written to a data file for possible later retrieval. In one embodiment, the data file may be stored in persistent backup store 150, while in another embodiment the data file may be stored elsewhere. The method may then advance to the end of the method.

Alternatively, if, in 606, it is determined that the component is not serializable, the method may advance to 610, wherein the component is passivated. Passivating a component may entail storing a copy of the component in another location, such that all data in the component is stored in a lossless manner. In one embodiment, passivating may entail calling an ejbPassivate method, which prepares the object to be serializable. In one embodiment, the passivated component may be stored in persistent backup storage 150 of FIG. 1.

In one embodiment, two different stores may be provided. A passivation store may be provided for components that require passivation to store their state. A checkpoint store may be provided for components whose state may be directly checkpointed without using passivation. The different stores may allow different structures to be used to optimize checkpointing. For example, checkpointing to the checkpoint store may be optimized by storing only state changes/deltas instead of storing the whole component. Both stores may be implemented in a persistent storage, such as persistent storage 150 of FIG. 1.

As will be described below, in one embodiment passivation may be followed by an activation process, wherein an a passivated component may be reactivated, i.e. brought back into active execution on a server. It is noted that in one embodiment, the activation process may leave the passivated copy of the component in storage, thereby providing a backup copy of the component. In one embodiment, the activation process may involve calling the ejbPassivate method. Passivation may be a less efficient mechanism for checkpointing than using a callback to facilitate serialization.

In 612 the method determines if the component has been properly passivated. If it is determined that the component has not been properly stored in 612, the method may advance to 614, wherein a log warning is created indicating that the component could not be checkpointed. This may allow a programmer or system administrator, for example, to take an appropriate corrective action. The checkpointing method may then end.

Alternatively, if it is determined in 612 that the component was properly stored in 610, the component is reactivated in 616, as described above. The method may then end.

Figure 7:
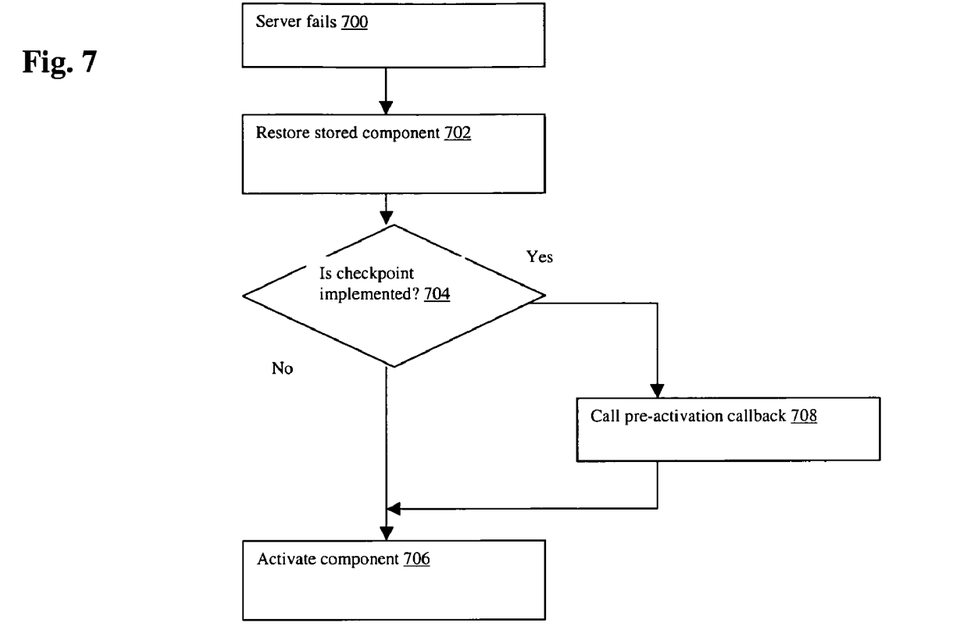
FIG. 7 is a flow diagram illustrating one embodiment of a method for activating an application component with optional callbacks.

FIG. 7 is a flow diagram illustrating one embodiment of a method for reactivating a component with optional callbacks. Referring collectively now to FIGS. 1–7, in 700 a server in a distributed system fails, which triggers a component activation process as described above. It is noted that in various embodiments, the method described in FIG. 7 may be triggered by events other than a server failure, such as a component or node failure, or the planned shutdown of a server or node, for example.

In 702, a checkpointed component is restored. In one embodiment, this may entail retrieving a serialized data file or passivated component from backup store 150 or another location. It is noted that in various embodiments, the restoration process of 702 may be substantially similar to the activation process of 616 in FIG. 6, while in other embodiments the restoration process may be substantially different. However, it is noted that one end result of various possible restoration processes may be the restoration of a serialized or passivated component, such that the component is in much the same state as it was prior to checkpointing. It is noted that in this state, the component may have reduplicated the state of an active component at the time of checkpointing. A pre-activation callback may be implemented to facilitate activation, as described below.

In 704, the method determines if a pre-activation callback has been implemented (e.g., as indicated in a deployment or configuration descriptor). As described above, not all components may implement a pre-checkpoint callback. Similarly, not all components may implement a pre-activation callback. In one embodiment, a pre-activation callback may reverse the flattening process of 604, while in other embodiments, a pre-activation callback may reestablish data connections or other required interfaces between the restored component and other external components.

If, in 704, it is determined that the component implements a pre-activation callback, the method advances to 708, wherein a pre-activation callback is executed, as described above. The method may then advance to 706.

Alternatively, if it is determined in 704 that the component does not implement a pre-activation callback, the method advances to 706. In 706 the method then returns the restored component to active execution, completing the checkpoint/restoration process.

Figure 8:
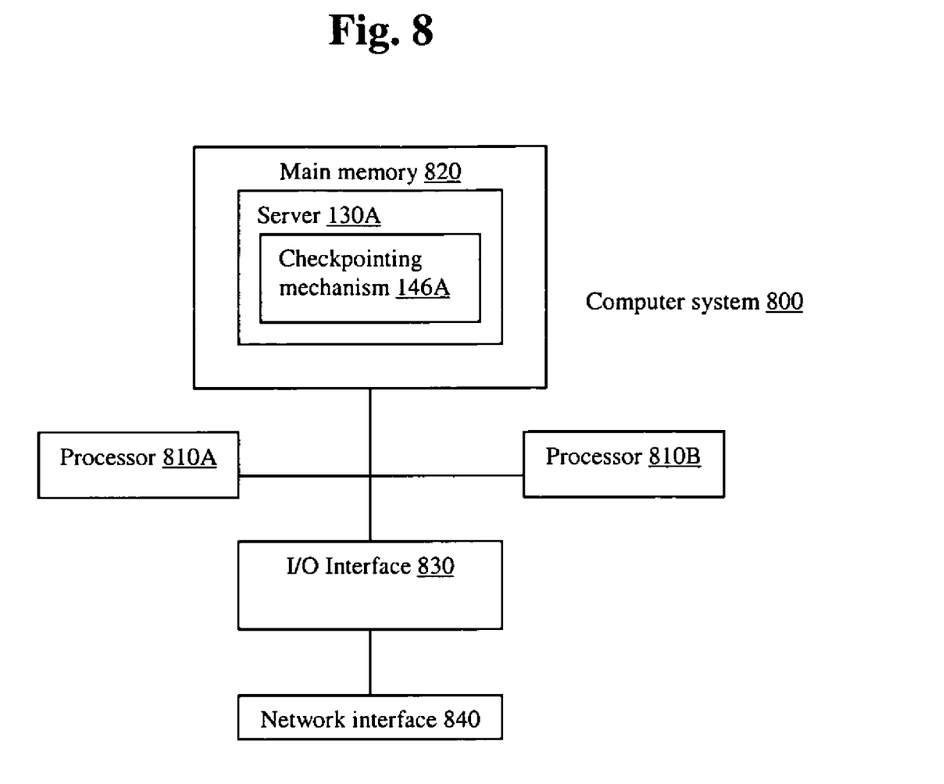
FIG. 8 illustrates an exemplary computer subsystem for implementing a checkpoint mechanism, according to one embodiment.

Turning now to FIG. 8, an exemplary computer subsystem 800 is shown. Computer subsystem 800 includes main memory 820, which is coupled to multiple processors 810A–B, and I/O interface 830. It is noted that the number of processors is purely illustrative, and that one or more processors may be resident on the node. I/O interface 830 further connects to network interface 840. Such a system is exemplary of a load balancer, a server in a cluster or any other kind of computing node in a distributed system. Such a system may also be exemplary of nodes 120A–B, as described in FIG. 1.

Processors 810A–B may be representative of any of various types of processors such as an x86 processor, a PowerPC processor or a CPU from the SPARC family of RISC processors. Likewise, main memory 820 may be representative of any of various types of memory, including DRAM, SRAM, EDO RAM, DDR SDRAM, Rambus RAM, etc., or a non-volatile memory such as a magnetic media, e.g., a hard drive, or optical storage. It is noted that in other embodiments, main memory 800 may include other types of suitable memory as well, or combinations of the memories mentioned above.

As described in detail above in conjunction with FIGS. 1–7, processors 810A–B of computer subsystem 800 may execute software configured to execute a method for checkpointing and activation of an application component. The software may be stored in memory 820 of computer subsystem 800 in the form of instructions and/or data that implement the operations described above.

For example, FIG. 8 illustrates server 130A and a checkpointing mechanism stored in main memory 820. The instructions and/or data that comprise server 130A and application component 140A may be executed on one or more of processors 810A–B, thereby implementing the various functionalities of server 130A and component 140A as described above.

In addition, other components not pictured such as a display, keyboard, mouse, or trackball, for example may be added to computer subsystem 800. These additions would make computer subsystem 800 exemplary of a wide variety of computer systems, such as a laptop, desktop, or workstation, any of which could be used in place of computer subsystem 800.

Various embodiments may further include receiving, sending or storing instructions and/or data that implement the operations described above in conjunction with FIGS. 1–7 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    deploying a plurality of application components on a server;
    determining checkpoint information for each application component, wherein said determining the checkpoint information comprises applying a checkpoint selection heuristic to an application component, wherein said applying the checkpoint selection heuristic comprises selecting checkpoints based on a description of one or more methods of the application component; and
    selectively checkpointing each component during execution of each component, according to the checkpoint information for each component.

2. The method of claim 1, wherein said applying the checkpoint selection heuristic to each application component comprises determining which of the one or more methods of the application component modifies the state of the component based on the description of the one or more methods.

3. The method of claim 1, wherein said determining the checkpoint information comprises indicating the checkpoint information with a deployment descriptor.

4. The method of claim 3, wherein said indicating the checkpoint information comprises indicating at a component descriptor level whether one or more methods in an application component should or should not be checkpointed.

5. The method of claim 4, wherein said indicating the checkpoint information comprises indicating at a module descriptor level whether all application components associated with a module should or should not be checkpointed.

6. The method of claim 5, wherein said indicating the checkpoint information comprises indicating at an application descriptor level whether all application components associated with an application should or should not be checkpointed.

7. The method of claim 6,
    wherein said indicating at a component descriptor level overrides said indicating at a module descriptor level; and
    wherein said indicating at a module descriptor level overrides said indicating at an application descriptor level.

8. The method of claim 3, wherein said indicating the checkpoint information comprises indicating that checkpointing should occur after executing a method.

9. The method of claim 3, wherein said indicating the checkpoint information comprises indicating that checkpointing should occur after executing a transaction.

10. The method of claim 1 further comprising:
    determining that an application component implements a first callback subroutine; and
    executing the first callback subroutine prior to said selective checkpointing in response to said determining, wherein said first callback routine prepares said application component for checkpointing.

11. The method of claim 1, further comprising reactivating an application component in response to a server failure.

12. The method of claim 11, further comprising:
    determining that an application component implements a second callback subroutine; and
    executing a second callback routine prior to said reactivating of said application component in response to said determining;
    wherein said callback routine prepares said application component for said reactivating.

13. A distributed system, comprising:
    a first server;
    a plurality of application components operable to execute on said first server;
    said first server comprising a checkpointing mechanism;
        wherein said checkpointing mechanism is operable to:
            determine that an application component of the plurality of application components implements a first callback routine,
            execute said first callback subroutine, wherein said first callback routine prepares the application component for selective checkpointing; and
            selectively checkpoint the plurality of components during execution of said components according to checkpoint information associated with each of said application components.

14. The system of claim 13, wherein said checkpointing mechanism is operable to execute a checkpoint selection heuristic, wherein the checkpoint selection heuristic makes checkpoint selections based on a description of one or more methods of the application component.

15. The system of claim 13, further comprising a deployment descriptor operable to indicate said checkpoint information.

16. The system of claim 15, wherein said deployment descriptor comprises an application descriptor level operable to indicate that all application components associated with an application should or should not be checkpointed.

17. The system of claim 16, wherein said deployment descriptor comprises a module descriptor level operable to indicate that all application components associated with a module should or should not be checkpointed.

18. The system of claim 17, wherein said deployment descriptor comprises a component descriptor level operable to indicate that one or more methods in an application component should or should not be checkpointed.

19. The system of claim 18,
wherein said component descriptor level is operable to override said module descriptor level; and
wherein said module descriptor level is operable to override said application descriptor level.

20. The system of claim 15, wherein said deployment descriptor is operable to indicate that checkpointing should occur after executing a method.

21. The system of claim 15, wherein said deployment descriptor is operable to indicate that checkpointing should occur after executing a transaction.

22. The system of claim 13, wherein said distributed system further comprises a second server, wherein said second server is operable to reactivate a backup application component in response to a failure of said first server.

23. The system of claim 22, wherein said checkpointing mechanism is operable to execute a second callback routine, wherein said callback routine prepares said application component for said reactivating.

24. A computer accessible storage medium operable to store program instructions for a method comprising:
deploying a plurality of application components on a server;
determining checkpoint information for each application component, wherein said determining the checkpoint information comprises applying a checkpoint selection heuristic to an application component, wherein said applying the checkpoint selection heuristic comprises selecting checkpoints based on a description of one or more methods of the application component; and
selectively checkpointing each component during execution of each component, according to the checkpoint information for each component.

25. The computer accessible medium of claim 24, wherein said applying the checkpoint selection heuristic to each application component comprises determining which of the one or more methods of the application component modifies the state of the component based on the description of the one or more methods.

26. The computer accessible medium of claim 24, wherein said determining the checkpoint information comprises indicating the checkpoint information with a deployment descriptor.

27. The computer accessible medium of claim 26, wherein said indicating the checkpoint information comprises indicating at a component descriptor level whether one or more methods in an application component should or should not be checkpointed.

28. The computer accessible medium of claim 27, wherein said indicating the checkpoint information comprises indicating at a module descriptor level whether all application components associated with a module should or should not be checkpointed.

29. The computer accessible medium of claim 28, wherein said indicating the checkpoint information comprises indicating at an application descriptor level whether all application components associated with an application should or should not be checkpointed.

30. The computer accessible medium of claim 29,
wherein said indicating at a component descriptor level overrides said indicating at a module descriptor level; and
wherein said indicating at a module descriptor level overrides said indicating at an application descriptor level.

31. The computer accessible medium of claim 26, wherein said indicating the checkpoint information comprises indicating that checkpointing should occur after executing a method.

32. The computer accessible medium of claim 26, wherein said indicating the checkpoint information comprises indicating that checkpointing should occur after executing a transaction.

33. The computer accessible medium of claim 24 further comprising:
determining that an application component implements a first callback subroutine; and
executing the first callback subroutine prior to said selective checkpointing in response to said determining, wherein said first callback routine prepares said application component for said selective checkpointing.

34. The computer accessible medium of claim 24, further comprising reactivating an application component in response to a server failure.

35. The computer accessible medium of claim 34, further comprising:
determining that an application component implements a second callback subroutine;
executing a second callback routine prior to said reactivating of said application component in response to said determining; and
wherein said callback routine prepares said application component for said reactivating.

36. A method, comprising:
deploying a plurality of application components on a server;
determining checkpoint information for each application component, wherein said determining the checkpoint information comprises indicating the checkpoint information with a deployment descriptor, wherein said indicating the checkpoint information comprises:
indicating at a component descriptor level whether one or more methods in an application component should or should not be checkpointed;
indicating at a module descriptor level whether all application components associated with a module should or should not be checkpointed;
indicating at an application descriptor level whether all application components associated with an application should or should not be checkpointed;
wherein said indicating at a component descriptor level overrides said indicating at a module descriptor level; and
wherein said indicating at a module descriptor level overrides said indicating at an application descriptor level; and
selectively checkpointing each component during execution of each component, according to the checkpoint information for each component.

* * * * *